(12) United States Patent
Dirix et al.

(10) Patent No.: US 8,714,366 B2
(45) Date of Patent: May 6, 2014

(54) GUIDE PLATE FOR GUIDING BULK PRODUCTS AND SORTING MACHINE WITH SUCH A GUIDE PLATE

(75) Inventors: Bert Dirix, Linter (BE); Joachim Van Der Perre, Houthalen (BE); Raf Peeters, Maascik (BE)

(73) Assignee: Visys NV, Hasselt (BE)

( * ) Notice: Subject to any disclaimer, the term of this patent is extended or adjusted under 35 U.S.C. 154(b) by 0 days.

(21) Appl. No.: 13/500,576

(22) PCT Filed: Oct. 5, 2010

(86) PCT No.: PCT/BE2010/000068
§ 371 (c)(1),
(2), (4) Date: Jul. 24, 2012

(87) PCT Pub. No.: WO2011/041857
PCT Pub. Date: Apr. 14, 2011

(65) Prior Publication Data
US 2012/0279909 A1   Nov. 8, 2012

(30) Foreign Application Priority Data
Oct. 5, 2009  (BE) .................... 2009/0605

(51) Int. Cl.
B07C 1/00 (2006.01)
B65G 11/00 (2006.01)
(52) U.S. Cl.
USPC ............ 209/655; 209/911; 209/924; 193/2 R; 193/25 R; 193/25 E
(58) Field of Classification Search
USPC ........ 209/552, 655, 911, 924; 193/2 R, 25 R, 193/25 A, 2 D, 25 E
See application file for complete search history.

(56) References Cited

U.S. PATENT DOCUMENTS

| 3,479,206 A | * | 11/1969 | Patterson | 65/324 |
| 4,693,355 A | * | 9/1987 | Bochi et al. | 193/2 R |
| 4,889,241 A | | 12/1989 | Cogan et al. | |

FOREIGN PATENT DOCUMENTS

| DE | 44 29 692 A1 | 3/1995 | |
| DE | 35 00 206 A1 | 3/2012 | |
| EP | 1 726 372 A1 | 11/2006 | |
| JP | 640534 * | 2/1994 | 193/2 R |
| NL | 1 018 224 C | 12/2002 | |
| WO | 01/07950 A1 | 2/2001 | |
| WO | 2004/082855 A1 | 4/2012 | |

OTHER PUBLICATIONS

International Search Authority/European Patent Office (ISA/EP). International Search Report, Application No. PCT/BE10/00068. Mar. 11, 2011.
International Preliminary Examining Authority/European Patent Office (IPEA/EP). International Preliminary Report on Patentability, Application No. PCT/BE10/00068. Oct. 4, 2011.

* cited by examiner

Primary Examiner — David H Bollinger
(74) Attorney, Agent, or Firm — The Marbury Law Group, PLLC (57) ABSTRACT

This application describes a guide plate for collecting and discharging bulk products (12), comprising a first segment (14), said first segment (14) comprising damping means (19, 20), which, during use, dissipate the collision energy of each product (12) to be collected essentially individually. Further, this application describes a sorting machine for the sorting of a continuous single layer stream of products, in which said sorting machine contains a feeding unit, an analysis unit, a removal unit and transport unit, where said transport unit contains such a guide plate in order to collect the products coming from the feeding unit.

10 Claims, 4 Drawing Sheets

GUIDE PLATE FOR GUIDING BULK PRODUCTS AND SORTING MACHINE WITH SUCH A GUIDE PLATE

RELATED APPLICATIONS

This application is a U.S. national phase entry under 35 U.S.C.§371 of PCT Application PCT/BE2010/000068, filed Oct. 5, 2010, which claims priority to Belgian Application BE 2009/0605, filed Oct. 5, 2009.

TECHNICAL FIELD

The application pertains to machines for the continuous sorting of a stream of parallel products such as bulk products, said products preferably being sorted on the basis of their optical properties. In particular, this application pertains to guide plates for gathering and guiding further a stream of products.

BACKGROUND

Machines for the sorting of bulk products being supplied in a continuous parallel stream are well known. Such sorting machines comprise a feeding unit, an analysis unit, a removing unit and a discharge unit. The feeding unit supplies the stream of products to be sorted in a continuous manner to the analysis unit. The analysis unit analyses each product in the product stream individually for one of several previously selected properties such as colour, shape and texture. This analysis is preferably performed by optical observation. Based on this analysis, the analysis unit will investigate whether the individually inspected product satisfies well-defined criteria with respect to the observed properties. If the product does not satisfy these criteria, the removal unit, controlled for this purpose by the analysis unit, will remove the product from the product stream. The products that meet the criteria are collected by the discharge unit for further processing.

An example of such a sorting machine can be found in the international patent application WO 2004/82855 A1, in particular FIG. 2. This international patent application relates to a free-flight sorting machine in which the feeder unit is a conveyer belt. The products leave the conveyer belt with a speed vector determined by this conveyer belt. The analysis of the products and, if necessary, their subsequent removal, takes place when these products propagate in a rather horizontal direction as shown in FIG. 2. The products that meet the criteria and therefore remain in the product stream are collected by a discharge unit containing a curved guide plate which guides the sorted products to a subsequent conveyer belt.

Another example of such a sorting machine can be found in the international patent application WO 2001/07950 A1, in particular FIG. 1. This international patent application also relates to a free flight sorting machine whose feeding unit is a conveyer belt. Here also, the products leave this conveyer belt with a velocity vector determined by this conveyer belt. The analysis of the products and, if required, the subsequent removal take place when these products propagate in a rather vertical direction as shown in this FIG. 1. The products that meet the criteria and therefore remain in the product stream are collected by a discharge unit, which guides the sorted products via a curved guide plate to a subsequent conveyer belt.

Another type of sorting machine is described in the European patent application EP 1 726 372 A1, in particular, in FIG. 1. The feeding unit includes a conveyer or vibrating table followed by a chute. The products leave the conveyer belt with a small forward velocity but when sliding over this chute, they will accelerate under the influence of gravity. The products leave the chute with a velocity vector determined by the curvature and the positioning of said chute. The analysis of the products and, if required, their subsequent removal, takes place when these products are moving in a rather vertical direction. Sorting machines of this type are known as free-fall sorting machines.

A requirement for such sorting machines is that they do not or only to a minor extent affect the properties and the orientation of the products when the products are moving through the sorting machine. This requirement is even more important once the products have been analysed and sorted.

The present application teaches a guide plate that does not affect or only to a limited degree affects the properties and orientation of the sorted products. The present application teaches for this purpose a guide plate that maintains the orientation of the products. In addition, it teaches a sorting machine that comprises such a guide plate.

SUMMARY

In a first aspect, this application teaches a guide plate for collecting and discharging bulk products, comprising a first segment, said first segment comprising damping means, which during use dissipates the collision energy of each product to be collected in an essentially individual way. With guide plate is meant a plate or chute over which the products slide while in contact with this plate.

In addition to the damping means referred to above, the curvature of this first segment is preferably determined such that during use, the tangent to the surface of the first segment is essentially parallel to the tangent to the trajectory of the product to be collected.

These damping means may consist of fibres that are attached with only one end to the guide plate. The fibres may extend in the longitudinal direction of the guide plate or in a direction perpendicular to the surface of the guide plate.

These damping means may consist of a fluid cushion. The guide plate may contain openings to this purpose at the location of the first segment, which openings allows the transport of the fluid through the guide points.

The guide plate according to this first aspect can further comprise a second segment, which, during use, discharges the collected products in a sliding way. The surface of this second segment is preferably formed of a material with a low coefficient of friction.

In a second aspect, this application teaches a sorting machine for the sorting of a continuous single layer of bulk products, said sorting machine comprising a feeding unit for supplying products for analysis by an analysis unit, a removal unit which removes the analysed products under control of the analysis unit and a discharge unit to collect and discharge the retained products, said discharge unit containing a guide plate according to one of the embodiments of the first aspect of this application.

DESCRIPTION

This application contains different possible embodiments, not all of which are illustrated by drawings. These drawings are schematic and not to scale since they have the sole purpose of illustrating and explaining the structure and operation of the corresponding embodiments. Identical or equivalent elements are therefore denoted by the same symbol in the different drawings.

The embodiments of the guide plate according to this, application enable the person skilled in the art to create equivalent embodiments of this guide plate. The scope of protection of this application is therefore only limited by the claims and not by the description and the drawings included in it.

As stated above, sorting machines 4 allow bulk products supplied by other machines 2 to a production line 1, to be sorted in a single-layer continuous stream of parallel products. This continuous sorting process comprises, among others, the following steps: the transport of the continuous product stream to an inspection zone 11 where the products 9 are analysed individually, the transporting of this continuous product stream through said inspection zone 11, while the product 9 moves in free fall or free flight 10,10', or while the product is still on the feeding unit 5 such as a conveyer belt or guide plate, the transport of the analysed production stream after this inspection zone 11, possibly combined with the removal or discharge of certain products 21 on the basis of the results of their analysis in the inspection zone 11 and the collection of the product stream in order to transport the products 12 further, typically to other machines 3 in the production line 1. In order to allow the individual analysis of each product 9 the delivered products 9 must be transported in a single product layer through the inspection zone 11. Once the retained products 12 are collected by the discharge unit 8, they can be transported further in a single layer or in multiple layers. To carry out this sorting process, such a sorting machine 4 comprises, among others, a feeding unit 5, an analysis unit 6, a removal unit 7 and a discharge unit 8 as shown in FIG. 1.

In every sorting process, it is important at least to maintain the yield of the sorting process and preferably to increase it. This can be done, among other things, by affecting as little as possible the product quality and preferably by preserving it. In the different steps of the sorting process, therefore, the integrity of the products in the product stream must be maintained at the best possible level. This can be done, e.g., by allowing the analysis process to take place in the best possible way. In the inspection zone 11, therefore, the products 9 are preferably delivered in the most uniform way possible to the analysis unit 6.

In a continuous sorting process, the products are transported at a considerable speed through the production line 1, in particular through the sorting machine 4. Due to these high speeds, the transported products may be damaged as they are transferred at high speed from one part of the production line to the next part.

Figure 1:
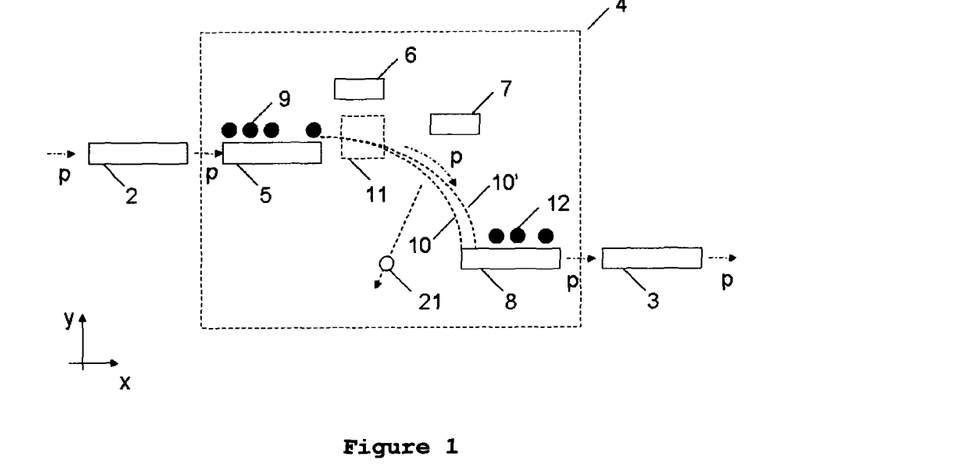
FIG. 1 shows schematically an overview of a production line for the continuous processing of a parallel single layer stream of products, which comprises a sorting machine with a discharge unit, more particularly a guide plate according to this application.

An example of this is the transition from the feeding unit 5 to the discharge unit 8 in a continuous sorting machine as shown in FIG. 1. When the products 9 have been inspected, they move in free fall or free flight 10,10' further to the discharge unit 8 at a speed of between 2 and 6 m/s, typically at 3 m/s. Due to the high speed of the products in the continuous product stream during this movement have a high speed, a considerable amount of kinetic energy is released during the contact between the products 12 and the discharge unit 8. Depending on the nature of the analysed product and its speed upon impact with the discharge unit 8, the product 12 may be damaged to a minor a major extent when landing. Since this often involves products 12 at the end of the sorting process, they have a high added value and any losses due to transportation must be avoided.

It is not permitted for certain products to absorb this kinetic energy themselves. This is certainly the case with brittle and/or fragile products such as raspberries and walnuts, which are usually transported in the frozen state so that upon collision with a hard object the product may crack or even break in pieces. For other products such as olives, the quality and therefore also the economic value of the product is determined by its form and/or appearance. A deviation from the preconceived ideal shape is undesirable since such a product is then categorized to a lower quality class having a lower sale price.

With the presently used discharge units, the products are collected by a straight or curved guide plate, typically made of stainless steel. Examples are the guide plates shown in FIG. 2 of the international patent application WO2004/82855 A1 and in FIG. 1 of international patent application WO2001/07950A1. In tests, including those on frozen raspberries that are typically supplied at 6 $m^3$/h, it has been found that such a rigid guide plate leads to a breaking percentage of 30 to 40%, in other words one retained product out of three breaks when landing on the currently used guide plates. Since this percentage of losses pertains to accepted products 12 the economic loss is considerable.

Another example where a transition between components of the sorting machine 4 can lead to a reduced yield of the sorting process is in the feeding unit 5 of a free-fall sorting machine. In such a feeding unit, a chute is fed from a vibrating table, a conveyer belt or other feeding means. Typically, the feeding rate of such a feeding device is between 0.2 and 0.4 m/s, preferably 0.3 m/s. The products must be transferred from such a feeding device to the non-moving plate. Although the speed at which this transfer is made is limited, so that the products 9 will probably not be damaged, the orientation and position of the products 9 in the product stream can change. In the case of oblong products 9 such as beans whose longitudinal axis must be parallel to the direction of movement p of the product stream, such products may rotate during the transfer to the chute. As a result, these products may overlay each other during the subsequent free fall, which interferes with the analysis process and consequently lowers the quality and yield of the sorting process.

Figure 2:
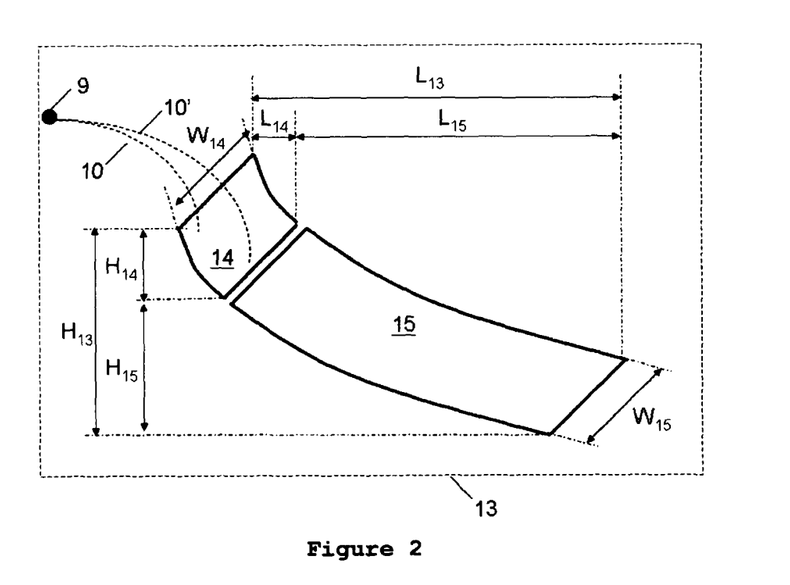
FIG. 2 shows a perspective view of a guide plate according to this application.

A first aspect of this application therefore describes various possible embodiments of a discharge unit 8 with a guide plate 13 that allows the yield of the sorting process to be preserved or even increased, inter alia by preserving the integrity of the collected products at least to a major extent, as shown in FIG. 2. Such a guide plate 13 preferably allows for a minimal disturbance of the movement of the product such that the relative position of the collected product relative to other products is essentially preserved. Such a guide plate can considerably reduce the losses of incoming products 12, in some cases even by an order of magnitude from 10 to 15% to 1%.

Such a guide plate 13 must be capable of absorbing and dissipating at least a considerable amount of the kinetic energy of the incoming product 12. The incoming product has a velocity vector perpendicular to the surface of the guide plate 13 at the location of the impact point 16 and a velocity vector tangential 17 to this surface 18. The guide plate 13 must absorb this vertical (i.e. perpendicular) kinetic energy to a sufficient degree in order to prevent damage to the incoming product 12, while the tangential kinetic energy must to a sufficient degree or at least partly be preserved in order to maintain the continuity of the product stream. The collision between the incoming product 12 and the guide plate 13 is damped, thereby preventing a considerable part of the kinetic energy from being absorbed by the product 12 and/or being transmitted by the guide plate 13 to the product stream. The collision between the incoming product 12 and the guide plate 13 may not be a purely elastic collision, because then the kinetic energy is transmitted back to the incoming product or other products in the product stream. Such a transfer of energy can lead to an undesirable deviation of the trajectory of the incoming product.

Preferably, the guide plate 13 will absorb the kinetic energy of each incoming product individually so that a collision between an incoming product 9 and the guide plate 13 has no or only very little influence on the collision between another product and the guide plate, regardless of where this other collision occurs. This local damping reduces the mutual influence between the different incoming products 12.

The guide plate should preferably have a low coefficient of adhesion and friction. After the incoming product 12 has made contact with the guide plate 13 this contact must be maintained so that the product 12 can slide further over the guide plate. For this purpose, the guide plate 13 should have an adhesion and friction coefficient that is low enough to prevent the tumbling of the product after the collision if, for example, this tumbling could lead to additional damage.

A guide plate 13 that meets these requirements therefore comprises at least a first segment 14 configured to dissipate the collision energy at the contact between every incoming product and the guide plate to a considerable extent individually. Such a guide plate may further comprise a second segment 15 configured in to guide the collected and damped product essentially without friction.

The width $W_{14}$ of this first segment 14 is determined by the width of the product stream as shown in FIG. 2. In the food industry, this width is between 1 m and 3 m, typically 1.20 m. For this purpose, this first segment 14 extends at least over the width of the incoming continuous single-layer stream of parallel products, so that all parallel products are collected as illustrated in FIG. 2.

The length $L_{14}$ of this first segment 14 depends, among other things, from the spread on the trajectories 10, 10' of the incoming products 12. Therefore, this first segment 14 is at least long enough to collect all incoming products regardless of where 16 the incoming product impacts the guide plate as shown in FIG. 2.

Figure 3:
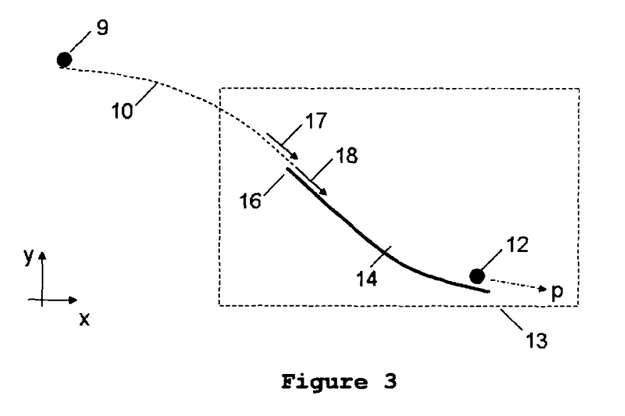
FIG. 3 illustrates in more detail the relationship between the speed vector of a sorted product and the shape of a guide plate according to this application at the location of the impact point.

By giving a suitable curvature to this first segment 14 the amount of collision energy can be reduced. To the extent that the tangent 18 to the surface of this first segment 13 runs parallel with the tangent 17 to the trajectory of the incoming product 12 at the location of the contact point 16, as shown in FIG. 3, the impact of the guide plate 13 on the movement of the incoming product 12 will be reduced. Hence, less kinetic energy will have to be absorbed. Since the products 12 move over a few tens of centimeters in free fall or free flight, there will inevitably be a spread in the trajectories 10, 10' of the incoming products 12. Even in the case of an optimal adaptation of the curvature of the upper part 14 of the guide plate 13 a number of products 12 will not impact tangentially onto the guide plate 13.

Although such a guide plate 13 is set up to be non-movable in the sorting machine 4 during the sorting process, the curvature of the first segment 14, at least the angle between the tangent to the top part of the first segment 4 and the tangent to the trajectories 10,10' of the incoming products 12, must be adjustable as a function of the type of sorting machine and the position of the discharge unit in the sorting machine. For this purpose, the guide plate contains the necessary means for adjusting the curvature, including the above-noted angle between the tangents of the first segment 14 and the product so that the incoming products touch the surface of the first segment 14 preferably tangentially.

Figure 4:
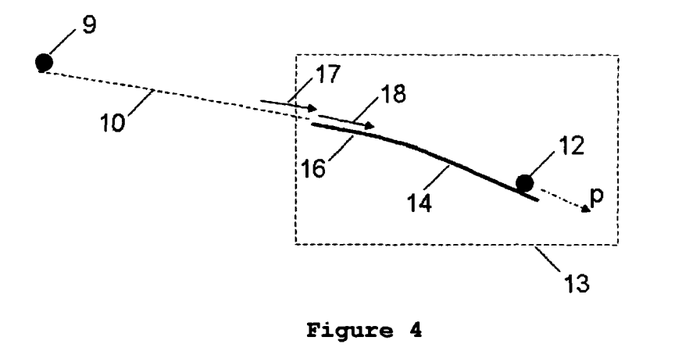
FIG. 4 illustrates in more detail the relationship between the speed vector of another sorted product and the shape of a guide plate according to this application at the location of the impact point.
Figure 5:
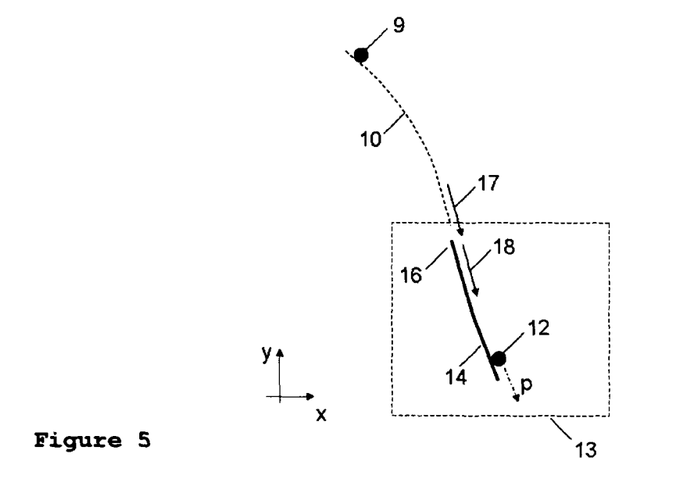
FIG. 5 illustrates in more detail the relationship between the speed vector and another sorted product and the shape of a guide plate according to this application at the location of the impact point.

The trajectories 10,10' of the incoming products 12 depend on the sorting machine 4 used. As already mentioned above, for free flight machines, the trajectory followed by the products from the conveyer belt 5 to the guide plate 13 is determined by their speed at the moment when they leave the conveyer belt 5. In the case of free fall machines, the curvature and the orientation of the chute 5 over which the products slide determine the trajectory that the products follow to the discharge unit 8. Depending on the position of the discharge unit 8 and the configuration of the sorting machine 4, the tangent 17 to the trajectory of the incoming product 12 at the location 16 of the contact point with the guide plate may vary from rather horizontal, as shown in FIG. 4, to even essentially vertical, as shown in FIG. 5.

In the ideal case, this first segment 14 can be described as a matrix of infinitesimally small areas whereby each area contains a damper. In this way, one obtains a local dissipation of the collision energy with a minimal influence on other incoming products, in which case the forward motion p of the collected product 12 is not impeded or only to a limited degree.

Figure 6:
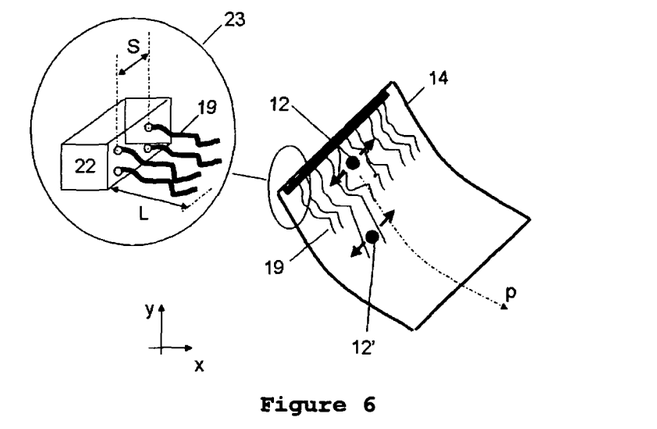
FIG. 6 shows a perspective view of the guide plate according to this application with a possible embodiment of the first segment.

A first segment 14 with such damping properties can be formed by applying at least one layer of fibres 19 to a surface of an upper part of guide plate 13, said fibres extending in the longitudinal direction $L_{13}$ of the guide plate 13 as shown in FIG. 6. These fibres 19 are attached to the upper edge of the first segment 14 so that the fibres cannot move in this longitudinal direction. Such fibre mats 23 can be easily fastened to the guide plate.

Since every fibre 19 is only attached at its upper end, the bottom end can move freely. If a product 12 impacts on these fibres 19, the contacted fibres 19 will be pushed away in the transverse direction $W_{13}$ of the guide plate 13 thereby consuming the energy of the collision as indicated in FIG. 6 by the transverse arrows. The part of the fibres 19 on which the incoming product 12 has collided will be pushed aside during the collision, whereby the amount of energy required depends on the position of the product 12 relative to the fixed end of the fibre. A product 12' that falls further down, i.e. downstream, onto the guide plate requires less energy to push the fibres apart. This mechanism can be modelled as a moment of force whereby the fibre functions as a lever to rotate the fibre 19 around its fixed end. The more rigid the fibre 19, the greater its resistance to this rotation and the more kinetic energy is required for this. The individual and local damping of the incoming product is determined by the properties of the fibres on which it falls and which are pushed apart by the product. The displacement of the fibres has essentially no effect on the position of the other fibres. The flexibility, length and friction of the fibre can be chosen as a function of the desired damping of the collision and braking of the forward motion p. An example of such fibres are nylon fibres PA6.10 which is a mixture of polyamide 6 and nylon 6.

The fibres are preferably made of a flexible material so that the fibre can essentially return after the rotation to its original position when the product has continued its propagation. The surface of the fibre may not be too elastic so as to prevent the incoming product from being bounced back by this surface. The incoming product 12 will continue its forward motion p, while due to the friction between the collected product 12 and the fibres 19 additional kinetic energy of the product is being dissipated. As the product moves over the displaced fibres, the fibres will return to their original position in order to receive the next product. The product will end up on the second segment 15 if present.

The dimensions of the fibres 19 such as diameter and length L, the number of fibres and their distribution over the volume of this layer can be selected as a function of the desired damping for a given sorting process. As an example, the diameter of each fibre 19 is preferably less than the diameter (perpendicular to the path 10) of the incoming product 12, so that each fibre 19 is only touched by a single descending product 12. The layer of fibres 19 must be sufficiently thick to prevent the incoming product 12 from touching the underlying surface through the layer of fibres.

The damping means 23 must therefore contain at least one layer of fibres. FIG. 6 shows the use of damping means where 2 layers of fibres, one above the other, are attached to a crossbar 22. When several rows of fibres are affixed one above the other, the position of the fibres relative to each other can be selected. The fibres can be placed one above the other in columns with a given stitch s determined inter alia as a function of the transverse diameter of the incoming products 12. The fibres can also be placed in a position shifted one to another in order to obtain the highest possible coverage of the surface of the guide plate 13.

The fibres 19 must be sufficiently long L such all incoming products 12 are collected regardless of any deviation of the trajectories 10,10' in the direction of forward motion p of the products 12. If the fibres 19 are too long, they will not only dissipate the collision energy but also reduce the further movement of the collected products 12 as a result of the friction between the fibres 19 and the products 12. The length L and the coefficient of friction of the fibre 19 may be selected as a function of the desired slowing down of the incoming product 12. This lower-positioned part of the fibres 19 can reduce the speed of the collected product, measured along the tangent to the surface of the first segment 14.

Figure 7:
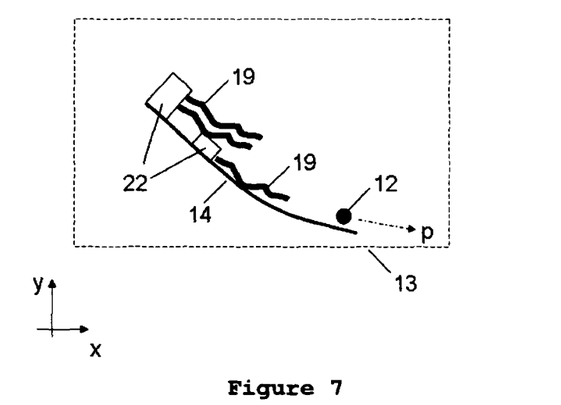
FIG. 7 shows a perspective view of the guide plate according to this application with another possible embodiment of the first segment.

An alternative to the embodiment shown in FIG. 6 is shown in FIG. 7. In this case, the damping means 23 of the first segment 14 consist of several rows of fibre mats, in this example 2. Each fibre mat may in turn consist of one or more rows of fibres whose positioning and properties can be selected as a function of the desired damping.

Figure 8:
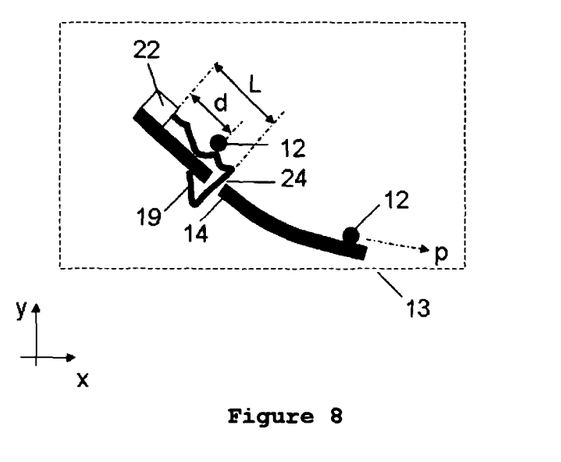
FIG. 8 shows a perspective view of a guide plate according to this application with another possible embodiment the first segment.

An alternative to the embodiment shown in FIG. 6 is shown in FIG. 8. As explained above, the damping of the fibre mats depends inter alia on the extent to which collision energy is consumed when moving these fibres 19 in a plane around their fixed end. The required amount of energy depends on the distance between the impact point 16 of the product 12 and the fixed end of the fibre. If the fibre is affixed at two points, more collision energy will be needed since the fibre is rotated around each fixation point. In the alternative embodiment shown in FIG. 8, the fibre with the length L is fixed at both ends, the lower end being fixed via an opening 24 to the bottom edge of the guide plate 13. When the product 12 hits the fibre mat 23, the moving product 12 exerts toward the upper fixed end a moment of force with a moment arm d and to the bottom fixed end a moment of force with an moment arm L-d. Through the choice of the length L and the extent to which the bottom end can still move freely, one can also again determine the degree of damping by the damping means 23.

An additional advantage of damping means 23 with fibres in the longitudinal direction as shown in FIGS. 6, 7, and 8 is their self-cleaning capacity. Residues and waste that may possibly get into the fibre mat 23 during the production process are loosened up and/or driven out by the stream of incoming products 12, after which they can be collected at the bottom of the guide plate 13. In this way a decrease in terms of damping properties of the fibre mat 23 due to accumulation of waste products is prevented.

A guide plate 13 in which the damping means 23 comprises fibres that are oriented in the longitudinal direction of the guide plate 13, as shown in FIGS. 6 and 7 also entails an additional advantage if such a guide plate is used as the chute in the feeding unit 5 of a free fall sorting machine. In such a feeding unit 5 the chute is supplied from a vibrating table, a conveyer belt or other feeding means. Typically, the feeding rate of such a feeding device is between 0.2 and 0.4 m/s, preferably 0.3 m/s. The products must be transferred from such a feeding unit to the non-moving chute. Although the speed at which this transfer is made is limited, so that the products 9 will probably not be damaged, the orientation and position of the products 9 in the product stream can be changed. In the case of oblong products 9 such as beans whose longitudinal axis must be parallel to the direction of movement p of the product stream, such products may rotate upon the transfer to the chute. As a result, these products may overlay each other during the subsequent free fall, which interferes with the analysis process and consequently lowers the quality and yield of the sorting process.

If at the upper portion of this chute damping means 23 are installed, consisting of fibres oriented in the direction of motion p of the products and fixed at one end as illustrated in FIGS. 6 and 7, then these fibres 19 will keep such oblong products in their trajectory when moving from the conveyer belt to the guide plate. The flexible fibres will only be pushed aside to a limited extent by the limited kinetic energy of the supplied products 9. Thanks to these fibres the oblong products remain in their trajectory and will slide to the inspection zone 11 in a uniform manner.

Figure 9:
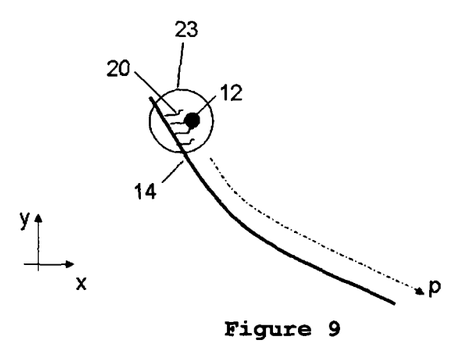
FIG. 9 shows a perspective view of a guide plate according to this application with another possible embodiment of the first segment.

A first segment 14 can also be formed by applying a strip of flexible microfibres 20 on a surface in the upper part of the guide plate 13 as shown in FIG. 9. The fibres 20 are fixed with their lower end to the surface of the guide plate 13 while their upper end extends in a direction essentially perpendicular to this surface. Since every fibre 20 is fixed only at its bottom end, its top end can move freely. If a product 12 falls on these fibres 20, the contacted fibres 20 will be pushed away, partly in the transverse direction $W_{13}$ and partly in the longitudinal direction $L_{13}$ of the guide plate, thereby consuming the energy of collision. The incoming product 12 will continue its forward motion p and end up on the second segment 15. The dimensions of the fibres 20 such as diameter and length, the density over the strip and the length of the strip can be chosen as a function of the desired damping for a given sorting process. Therefore, the diameter of each fibre 20 should preferably be smaller than the diameter (perpendicular to the path 10) of the incoming product 12 so that each fibre 20 is only touched by a single descending product 12. The strip of fibres must be long enough so that all incoming products 12 are collected regardless of any trajectory deviations in the direction of movement of the products. The density of fibres must be high enough to prevent the incoming product 12 from touching the surface underlying the strip of fibres. If the fibres 20 are too long, they will not only dissipate the collision energy but also interfere with the further movement of the products 12, because the incoming product 12 will sink into the strip of fibres. The fibres may be resilient to a limited extent to the degree that they spontaneously resume their original orientation once the product is collected and discharged.

Figure 10:
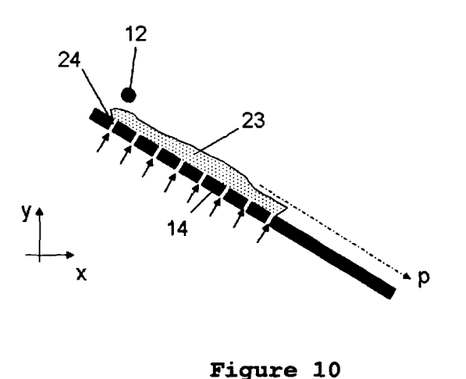
FIG. 10 shows a perspective view of a guide plate according to this application with another possible embodiment of the first segment.

A first segment 14 can also be formed by forming a fluid cushion 23. Such damping means 23 create a deformable layer above the surface of the guide plate 13. Each incoming product 12 will be individually damped by this fluid cushion, while the absorbed collision energy, thanks to the compressibility of the fluid, is essentially not passed on to the other incoming products. By selecting the properties of this fluid cushion, one can obtain the desired damping and braking. A fluid with a higher density will provide more damping, but this density may not be so high as to affect the neighbouring incoming products 12. A higher flow velocity can also provide more damping. The flow of this fluid cushion can even be guided in the direction of motion p of the incoming products 12, so that these products 12 are finally discharged at the flow velocity of this fluid cushion. In the embodiment shown in FIG. 10 an air cushion is formed by supplying air at a predetermined overpressure underneath the guide plate 13 at the location of the first segment 14. Through openings 14 in this guide plate 13 the fluid, such as air, can move from the rear surface to the upper portion so that a damping air cushion 23 can form on the upper portion of the guide plate 13. Such a guide plate must be provided with the necessary means such as pumps to feed this fluid at the appropriate speed and pressure.

The width $W_{15}$ of the second segment 15 is also determined by the width of the product stream. Therefore, this second segment 15 extends at least over the width of the incoming continuous stream of parallel products so that all collected parallel products 12 are discharged as shown in FIG. 2.

In an alternative embodiment, the width $W_{14}$ and/or $W_{15}$ may gradually increase or decrease and finally reach a width suitable for the entrance width of the following machine. The curvature and the length $L_{15}$ of this second segment are chosen as a function of the desired height $H_{13}$ of the guide plate 13 and of the speed at which the collected product may leave the guide plate. The guide plate 13 not only has the function of avoiding damage to the incoming product 12 as much as possible but also of bringing the collected product to an essentially horizontal path for further processing.

At least the surface of the second segment 15 is formed from a material with a coefficient of adhesion and friction suitable for the desired exit speed of the products 12. The surface of this second segment may, for example, be formed by smooth materials if a minimal speed decrease is desired. This may include metals such as polished metal, stainless steel, or coated steel, in which case the coating layer also gives the desired adhesion and friction properties. Examples of such coating layers are Teflon®, polycarbonates, . . . . These smooth materials may also be plastics such as Teflon®, polycarbonates . . . .

The surface of this second segment 15 is flat, preferably without grooves for guiding the collected products. Although such a guide plate 13 is mounted in the sorting machine in a non-movable way during the sorting process, it may be desirable to adjust the curvature of the second segment 15 as a function of the desired output speed of the products 12. In this case, the guide plate contains the necessary means for adjusting the curvature of the second segment 15.

In a guide plate 13 according to this application, it is thus possible to distinguish two segments 14, 15.

The guide plate 13 may therefore be constructed from two separate segments 14, 15 each having the desired dimensions and properties as described further in this first aspect. Such a configuration can simplify the design and production of the guide plate, because both segments 14, 15 can be fabricated separately.

The guide plate 13 may however also consist of a single plate with the desired coefficient of adhesion and friction. On the upper part of this guide plate, where the incoming products will land, the necessary damping means 23 may be provided in order to dissipate the collision energy to the appropriate degree to obtain the first segment 14 of the guide plate 13. The remaining lower part of the not-covered guide plate 13 then constitutes the second segment 15. Such an approach permits the adaptation of existing guide plates in a simple manner, because then only the correct damping means have to be applied in the top part of such a guide plate in order thus to form the first segment 13.

Figure 11:
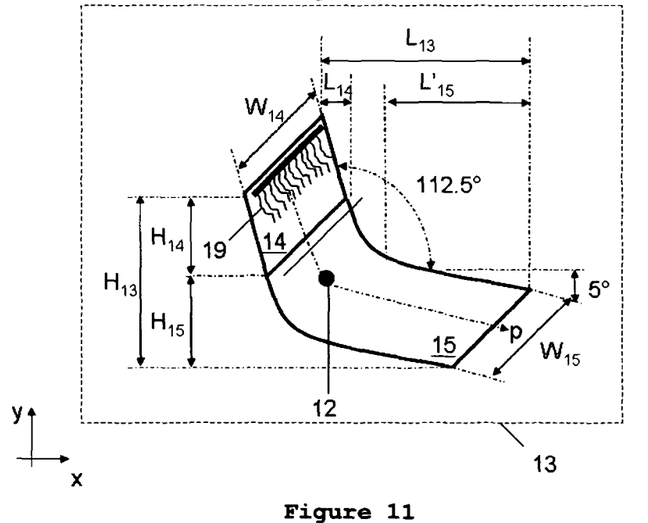
FIG. 11 shows a perspective view of a guide plate according to a preferred embodiment of this application.

In a preferred embodiment, this guide plate 13 consists of a curved plate as is illustrated in FIG. 11. Optionally, on both side edges of the guide plate, upright plates may be fixed preventing the products from falling off over a side edge of the guide plate. The tangent 18 to the surface of the upper part 14 of this curved plate 13 runs parallel with the tangent 17 to the trajectory 10 of the incoming product 12 so that there is a minimal impact from the guide plate 13 on the incoming product 12. The curvature of the remaining part 15 of the guide plate 12 is to be determined as a function of the desired dimensions ($H_{13}$, $L_{13}$, $H_{15}$, $L_{15}$) and the speed at which the product 12 leaves the curved plate 13. In one embodiment, illustrated by FIG. 11 the following dimensions were used: $H_{13}$=622 mm, $W_{14}$=$W_{15}$=853 mm, $L_{14}$=160 mm, $L'_{15}$=350 mm, wherein the transition between the straight, smooth first segment 14 and the straight, smooth second segment 15 was formed by a rounded part with a radius of curvature of 388 mm. The angle between the two straight segments was 112.5°. At the exit, i.e. at the lower end of the guide plate 13, the curved plate is preferably not completely horizontally directed but should display a small downward angle to the horizontal. This slope allows liquids such as water contained in the product stream to be carried off. This angle is typically about 5°. This curved plate is preferably made of stainless steel, in this example of brushed stainless steel.

The first segment 14 of the guide plate 13 is formed by providing fibre mats 23 on a surface at the upper part of the guide plate wherein the fibres 19 run in the longitudinal direction $L_{13}$ of the guide plate 13. When the incoming products fall on these fibres 19, they push 12 the fibres 19 outward, thus in the transverse direction $W_{13}$ of the guide plate 13, without substantially impeding the movement of the products 12 in the forward direction p in the sorting machine 4. By this movement of the brush hairs 19 the collision energy is to a large extent locally dissipated without interfering with other products 12 since by each product 12 only a limited number of brush hairs 19 are moved, and the collision energy is consumed in this movement. The fibres are made of PA6.10, a mixture of nylon and polyamide. The diameter of the fibres was 0.6 mm and the length L was 500 mm. The fibre mat 23 was made of 2 rows of fibres that were fixed essentially directly next to each other on the cross bar 22 so that there is a minimal space s between the fibres 19 and a maximal packing is obtained.

A second aspect of this application therefore describes sorting machines 4 containing a discharge unit 8 with a guide plate 13 as illustrated in the possible embodiments of the first aspect of this application.

As stated above, sorting machines 4 allow the sorting of products 9, preferably, bulk products, supplied in a continuous single-layer stream of parallel products. Such a sorting machine 4 comprises, inter alia, a feeding unit 5, an analysis unit 6, a removal unit 7 and a discharge unit 8 as is shown in FIG. 1.

The feeding unit 5 feeds the single-layer stream of products to be sorted 9 continuously to an inspection zone 11 for analysis of individual products by the analysis unit 6. Upon leaving the feeding unit 5 the product stream is only one product layer thick, and the trajectory and speed of each product 9 is preferably known or at least predictable. In this case one distinguishes free fall and free flight sorting machines depending on the way in which the products move to the inspection zone. In the case of a free fall sorting machine, the products 9 accelerate under the influence of gravity when they slide over a non-moving chute towards the inspection zone 11. This chute may be straight or curved. This chute may be smooth or contain grooves in order to guide the products to the inspection zone 11. The supply of the product stream to this chute can be done by, among others, a vibrating table, a conveyer belt or other supply devices. In the case of channel sorting machines, the products are fed in a feeding unit 9 containing parallel channels in which products are fed to the inspection zone 11. The feeding unit 9 can then consist of a plate with grooves in the longitudinal direction forcing the products in parallel paths.

The supply of the products 9 to the chute is typically done at a speed of 0.2 to 0.4 m/s, typically 0.3 m/s. During their movement over the chute, the speed of the products 9 increases to 2 to 6 m/s, typically 3 m/s. This acceleration has the advantage that successive particles are separated from each other in the direction of movement p. In the case of a free flight sorting machine, the product 9 acquires this speed, typically 2 to 6 m/s, from the conveyer belt that supplies the product stream to the inspection zone 11. Here, one may remark that in some free flight sorting machines, the analysis of the products takes place while the products 9 are still on the conveyer belt, while the removal of the undesired products takes place after the product stream has left the conveyer belt and is moving in free flight.

In the inspection zone 11 the analysis unit analyses each product individually regarding one or more previously selected properties such as colour, shape, and texture. This analysis is preferably performed by optical observation. For example, one can move a laser beam back and forth over the width of the product stream, wherein the transmitted and/or reflected light from the products 9 is captured and analysed. Based on this analysis, the analysis unit determines whether the individually inspected product 9, meets the well-defined criteria regarding the observed property/properties.

If the analysed product 9 does not meet these criteria, the removal unit 7, controlled for this purpose by the analysis unit 6, will remove this product 21 from the product stream. If the trajectory 10 and the speed of the analysed product are already determined upon leaving the feeding unit 5 one can easily predict the position of each analysed product 9 at the location of the removal unit 7. If this is not the case, the analysis unit 6 will contain additional means for determining the trajectory and speed of each analysed product 9.

Depending on the configuration of the sorting machine 4 the analysis and, if required, the removal of the analysed product, can take place at different locations of the product during its passage through the sorting machine. For some sorting machines, this will happen when the product is moving in the horizontal direction, in other sorting machines, this will happen when the product is moving in the vertical direction, in other words due to the gravitational acceleration.

The products 12 meeting the criteria are collected by the discharge unit 8 for further processing by other machines 3. The speed at which these products 12 hit the guide plate is that of their free fall or free flight movement, typically 2 to 6 m/s, preferably 3 m/s. The guide plate 12 must collect these incoming products 12 with minimal damage, guide them to a path allowing discharge to other machines 3, but also slow down the collected products 12. Typically the guide plate 13 will guide the collected products 12 to a conveyer belt or vibrating table which will discharge these products at speeds of about 1 m/s.

This discharge unit 8 therefore comprises a guide plate according to the first aspect of this application illustrated by the different possible embodiments described therein.

The invention claimed is:

1. A guide plate for collecting and discharging bulk products, comprising a first segment, said first segment comprising a damping apparatus, which during use dissipates the collision energy of each product to be collected in an essentially individual way, wherein said damping apparatus comprises damping means comprising fibres extending in the longitudinal direction of the guide plate and attached with only one end to the guide plate.

2. A guide plate according to claim 1, wherein the guide plate further comprises a second segment which, during use, discharges the collected products in a sliding way.

3. A guide plate according to claim 2, wherein the surface of said second segment is formed from a material having a coefficient of friction sufficiently low to guide the collected and damped product essentially without friction.

4. A sorting machine for the sorting of a continuous single layer of bulk products comprising a feeding unit to supply products for analysis by an analysis unit, a removal unit which removes the analysed products under control of the analysis unit and a discharge unit to collect and discharge retained products, wherein the discharge unit contains a guide plate, the guide plate comprising a first segment, said first segment comprising a damping apparatus, which during use dissipates the collision energy of each product to be collected in an essentially individual way, wherein said damping apparatus comprises damping means comprising fibres extending in the longitudinal direction of the guide plate and attached with only one end to the guide plate.

5. A sorting machine according to claim 4, wherein the guide plate is mounted so as to be non-movable during the sorting process.

6. A guide plate for collecting and discharging bulk products, comprising a first segment, said first segment having openings and comprising a damping apparatus, which during use dissipates the collision energy of each product to be collected in an essentially individual way, wherein said damping apparatus comprises damping means comprising a fluid cushion.

7. A guide plate according to claim 6, wherein the guide plate further comprises a second segment which, during use, discharges the collected products in a sliding way.

8. A guide plate according to claim 7, wherein the surface of said second segment is formed from a material having a coefficient of friction sufficiently low to guide the collected and damped product essentially without friction.

9. A sorting machine for the sorting of a continuous single layer of bulk products comprising a feeding unit to supply products for analysis by an analysis unit, a removal unit which removes the analysed products under control of the analysis unit and a discharge unit to collect and discharge retained products, wherein the discharge unit contains a guide plate, the guide plate comprising a first segment having openings and comprising a damping apparatus, which during use dissipates the collision energy of each product to be collected in an essentially individual way, wherein said damping apparatus comprises a fluid cushion.

10. A sorting machine according to claim 9, wherein the guide plate is mounted so as to be non-movable during the sorting process.

* * * * *